United States Patent

Lichtman et al.

Patent Number: 5,831,736
Date of Patent: Nov. 3, 1998

[54] METHOD AND APPARATUS FOR GENERATING A THREE-DIMENSIONAL TOPOGRAPHICAL IMAGE OF A MICROSCOPIC SPECIMEN

[75] Inventors: Jeff W. Lichtman, St. Louis; José-Angel Conchello, Creve Coeur, both of Mo.

[73] Assignee: Washington University, St. Louis, Mo.

[21] Appl. No.: 705,412

[22] Filed: Aug. 29, 1996

[51] Int. Cl.⁶ .......................... G01B 11/24; G01N 21/94; G02B 21/06

[52] U.S. Cl. ...................... 356/376; 250/559.22; 359/389

[58] Field of Search .................................. 356/375, 376; 250/559.02, 559.07, 237 G; 359/368, 389

[56] References Cited

U.S. PATENT DOCUMENTS

| | | |
|---|---|---|
| 4,579,454 | 4/1986 | Kleinknecht . |
| 4,627,730 | 12/1986 | Jungerman et al. . |
| 4,641,972 | 2/1987 | Halioua et al. . |
| 4,668,094 | 5/1987 | Matsumoto et al. ..................... 356/376 |
| 4,802,759 | 2/1989 | Matsumoto et al. ..................... 356/376 |
| 4,844,617 | 7/1989 | Kelderman et al. ..................... 356/376 |
| 4,867,570 | 9/1989 | Sorimachi et al. ..................... 356/376 |
| 4,884,880 | 12/1989 | Lichtman et al. . |
| 4,884,881 | 12/1989 | Lichtman et al. . |
| 5,020,891 | 6/1991 | Lichtman et al. . |
| 5,076,693 | 12/1991 | Teramoto . |
| 5,099,354 | 3/1992 | Lichtman et al. . |
| 5,099,363 | 3/1992 | Lichtman . |
| 5,166,505 | 11/1992 | Gorriz et al. . |
| 5,235,457 | 8/1993 | Lichtman et al. . |
| 5,239,366 | 8/1993 | Kittell et al. . |
| 5,243,665 | 9/1993 | Maney et al. . |
| 5,245,864 | 9/1993 | Sanchez . |
| 5,351,150 | 9/1994 | Lichtman et al. . |
| 5,493,400 | 2/1996 | Gorbler et al. ..................... 356/371 |
| 5,587,832 | 12/1996 | Krause ..................... 250/216 |
| 5,659,420 | 8/1997 | Wakai et al. ..................... 359/368 |

OTHER PUBLICATIONS

M.J. Offside, M.G. Somekh, and C.W. See, "Common path scanning heterodyne optical profilometer for absolute phase measurement", *Appl. Phys. Lett* 55 (20), pp. 2051–2053, Nov. 13, 1989.

M.J. Offside and M.G. Somekh, "Interferometric scanning optical microscope for surface characterization", *Appl. Opt.* 31 (31), pp. 6772–6782, Nov. 1, 1992.

Y. Fainman, E. Lenz, and J. Shamir, "Optical profilometer: a new method for high sensitivity and wide dynamic range", *Appl. Opt. 21* (17), pp. 3200–3208, Sep. 1, 1982.

M.R. Atkinson, A.E. Dixon, and S. Damaskinos, "Surface–profile reconstruction using reflection differential phase–contrast microscopy", *Appl. Opt.* 31 (31), pp. 6765–6771, Nov. 1, 1992.

M.R. Atkinson and A.E. Dixon, "Single–pinhole confocal differential phase contrast microscopy", *Appl. Opt. 33* (4), pp. 641–653, Feb. 1, 1994.

K.M. Lee and C.–C.J. Kuo, "Surface reconstruction from photometric stero images", *J. Opt. Soc. Am. A 10* (5), pp. 855–868, May 1993.

D. Pantzer, J. Politch, and L. Ek, "Heterodyne profiling instrument for the angstrom region", *Appl. Opt. 25* (22), pp. 4168–4172, Nov. 15, 1986.

*Primary Examiner*—Frank G. Font
*Assistant Examiner*—Zandra V. Smith
*Attorney, Agent, or Firm*—Howell & Haferkamp, L.C.

[57] ABSTRACT

A method and apparatus for generating an image of a specimen comprises dividing the in-focus plane of an objective of an optical apparatus into a plurality of grid regions. Incident light is directed to the grid regions to illuminate surface portions of the specimen that are within the grid regions. Light reflected from the surface portions is sensed to determine approximate spatial slopes of each surface portion associated with each grid region. The spatial slopes are integrated to generate a topographical map representative of surface portions of the specimen that are within the depth of focus of the objective. Consecutive planes can be obtained to generate topographical maps thicker than the depth of focus of the objective.

47 Claims, 5 Drawing Sheets

METHOD AND APPARATUS FOR GENERATING A THREE-DIMENSIONAL TOPOGRAPHICAL IMAGE OF A MICROSCOPIC SPECIMEN

BACKGROUND OF THE INVENTION

This invention relates to an apparatus and method of generating a three-dimensional topographic map (or image) of the surface of a microscopic specimen, and for determining spatial slopes of surface portions of the specimen.

Several methods and devices have been employed and/or proposed for determining surface profiles of a microscopic specimen. One such method employs a reflected-light scanning profilometer that uses two pin-hole apertures and two light detectors, one behind each pin-hole aperture. The pin-hole apertures are located adjacent, but not exactly at, conjugate image planes. The apertures are slightly out of focus by the same distance but in opposite directions. If the reflecting tile (i.e. portion of the specimen being observed) is in focus, the two detectors record the same light intensity. If the specimen is moved away from focus, the intensity at one detector increases while the intensity at the other decreases. The difference between the signals from the two detectors is used in a feedback control loop that translates the stage until the reflecting tile is in focus. This method gives the location of the object tile in the z-direction, but fails to consider the effects of the tilt angle of the reflecting tile.

Another method proposes a confocal scanning profilometer having two slit apertures which are near conjugate image planes but slightly out of focus. This method recognizes that dual out-of-focus pin-hole aperture designs do not work when the reflecting tile has large tilt angles. By using slit apertures, this proposed method extends the range of tilt angles that may be collected. However, this method is also capable of providing only the location of the object tile in the z-direction; it is incapable of determining the spatial slope (i.e., the slope considered with relation to space or three-dimensional slope) of the reflecting tile.

Another type of device is an interference (heterodyne) profilometer. With this type of device, two mutually coherent laser beams of slightly different frequency are combined or superimposed. The resulting beam has a beat at a frequency that may be recorded by electronic instruments. The combined beam is split into a reference beam and a probing beam. Depth information is obtained from the phase difference between the reference beam and the probing beam. These instruments measure depth, not slope. Moreover, microphonics (i.e., acoustic noise) may alter the optical path length of the two beams relative to one another thereby resulting in wrong measurements. Another potential difficulty is thermal expansion, which may also alter the optical path lengths of the two beams relative to one another.

To avoid or ameliorate measurement errors introduced by microphonics and thermal expansion, the probing beam and the reference beam may be made to travel through a common path. This may be accomplished by splitting a laser beam into two components, one of which is frequency-shifted by an acoustic wave. After frequency-shifting, the two beams are superimposed. The resulting beam illuminates the back focal plane of an objective that has a hole in the middle. The portion passing through this hole serves as a reference beam. The portion that passes through the glass in the objective focuses into a diffraction-limited spot and serves as the probing beam. Both portions are reflected and propagate back through a common path up to a beam splitter before they are detected. On the light return path, the two beams are concentric. The reference beam travels in the center of the probing beam but without overlapping. Thus the two beams share a common path and the instrument is less affected by microphonics and thermal expansion. However, this instrument is incapable of measuring the spatial slope of a reflecting tile.

Another method is based on projecting a sinusoidal grating into the specimen. It records the reflected image for different phase angles of the projected grating. This results in a series of intensities for each image pixel. The phase of the discrete Fourier transform of the series of intensity is used to determine the phase of the grating reflected off the specimen relative to that reflected off a reference plane perpendicular to the optical axis. The phase difference is then used to determine height. This method does not provide angular information or otherwise determine the spatial slope of portions of the specimen.

Another method employs a confocal scanning optical profilometer. This device employs a dual-pin-hole aperture/ dual detector arrangement that has an aperture on a confocal back focal plane in front of the pin-hole aperture. This device is capable of detecting tilt angles in only one orientation. Moreover, because this device uses two optical paths and two detectors, a tedious alignment and calibration procedure is necessary because the two optical paths are not identical and the detectors do not necessarily have identical sensitivity to light.

SUMMARY OF THE INVENTION

Among the several objects of the present invention is the provision of an apparatus and method employing a confocal microscope for obtaining high resolution topographies of surfaces that reflect light; the provision of an apparatus and method for determining spatial slopes of surface portions (e.g., reflecting tiles) of a microscopic specimen; the provision of such an apparatus and method which is capable of determining such spatial slopes even when such slopes are relatively large; the provision of such an apparatus and method which does not depend on phase or coherent light; the provision of such an apparatus and method in which microphonics and thermal expansion have little or no effect; the provision of such an apparatus and method which does not require tedious calibration and alignment procedures; the provision of an apparatus and method for generating a map (or image) of the surface of the specimen; and the provision of such an apparatus and method in which an image may be generated relatively quickly and accurately.

In general, a method of the present invention for generating an image of a specimen comprises dividing the in-focus plane of an objective of a confocal microscope into a plurality of grid regions. Incident light is directed to the grid regions to illuminate surface portions of the specimen that are within the grid regions. Light reflected from the surface portions is sensed to determine approximate (i.e., representative) spatial slopes of each surface portion associated with each grid region. The spatial slopes are integrated to generate a topographical map representative of surface portions of the specimen that are within the depth of focus of the objective.

In another aspect of the present invention, a method of generating an image of a specimen comprises dividing the in-focus plane of an objective of a confocal microscope into a plurality of grid regions. The specimen is positioned a distance from the objective of the optical apparatus so that surface portions of the specimen are within the grid regions of the in-focus plane. Incident light is directed to the grid regions to illuminate the surface portions of the specimen that are within the grid regions. Light reflected from said surface portions is sensed to determine approximate spatial slopes of each surface portion associated with each grid region. The distance between the specimen and objective is then altered so that other surface portions of the specimen, which were previously outside the grid regions of the focal plane (e.g., outside the depth of field of the objective lens), are within previously unoccupied grid regions of the in-focus plane. Incident light is directed to the grid regions to illuminate the other surface portions of the specimen that are within the previously unoccupied grid regions. Light reflected from the other surface portions is sensed to determine approximate spatial slopes of each of the other surface portions associated with each of the previously unoccupied grid regions. The determined spatial slopes are then integrated to generate a topographical map representative of surface portions of the specimen.

In another aspect of the present invention, a method of approximating a spatial slope (i.e., determining a representative spatial slope) of a surface portion of a specimen comprises directing incident light along an incident light path of a confocal microscope to the surface portion of the specimen to reflect light from the surface portion. An intensity profile associated with the reflected light is sensed.

In another aspect of the present invention, a confocal microscope is configured for approximating a spatial slope of a surface portion of a specimen. The microscope has optical elements, an exit pupil, and a sensor. The optical elements are configured for directing incident light along an incident light path from a light source to the surface portion of the specimen and for directing light reflected from the surface portion along a return light path. The exit pupil is in the return light path and is positioned and configured so that the exit pupil is illuminated by the reflected light in a manner (e.g. profile) dependent upon the spatial slope of the surface portion of the specimen. A sensor is in the return light path for generating at least one signal representative of the profile of illumination of the exit pupil.

In yet another aspect of the present invention, a confocal microscope is configured for generating an image of a specimen. The microscope has an objective, optical elements, a sensor, and a processor. The objective is configured for being spaced a distance from the specimen at which at least part of the specimen is within the in-focus plane of the objective. The optical elements are configured for directing incident light to discrete regions of the in-focus plane of the objective to illuminate surface portions of the specimen that are within of the discrete regions. The sensor is configured for sensing light reflected from the surface portions and for generating signals representative of the sensed light. The processor is configured for approximating spatial slopes of each surface portion of the specimen within the discrete regions of the in-focus plane.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
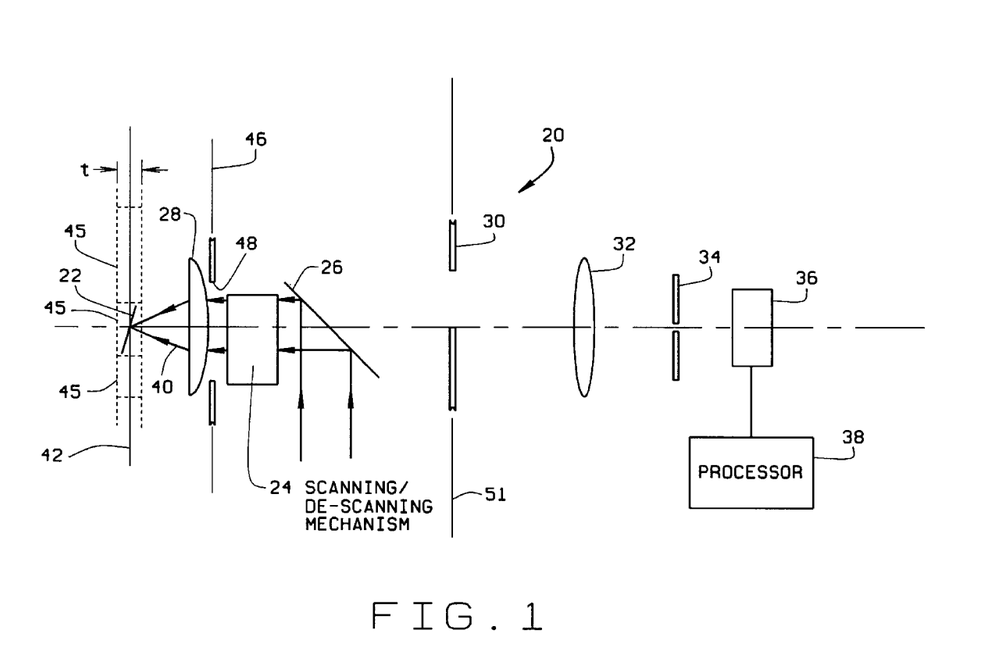
FIG. 1 is a schematic of a reflected light confocal scanning microscope of the present invention showing incident light being focused on an object tile of a specimen.

Referring now to the drawings, and first more particularly to FIG. 1, a reflected light confocal scanning profilometer or microscope of the present invention is indicated in its entirety by the reference numeral 20. The microscope is used for obtaining high resolution topographies of light reflecting surfaces of a specimen (whether organic or inorganic).

Figure 2:
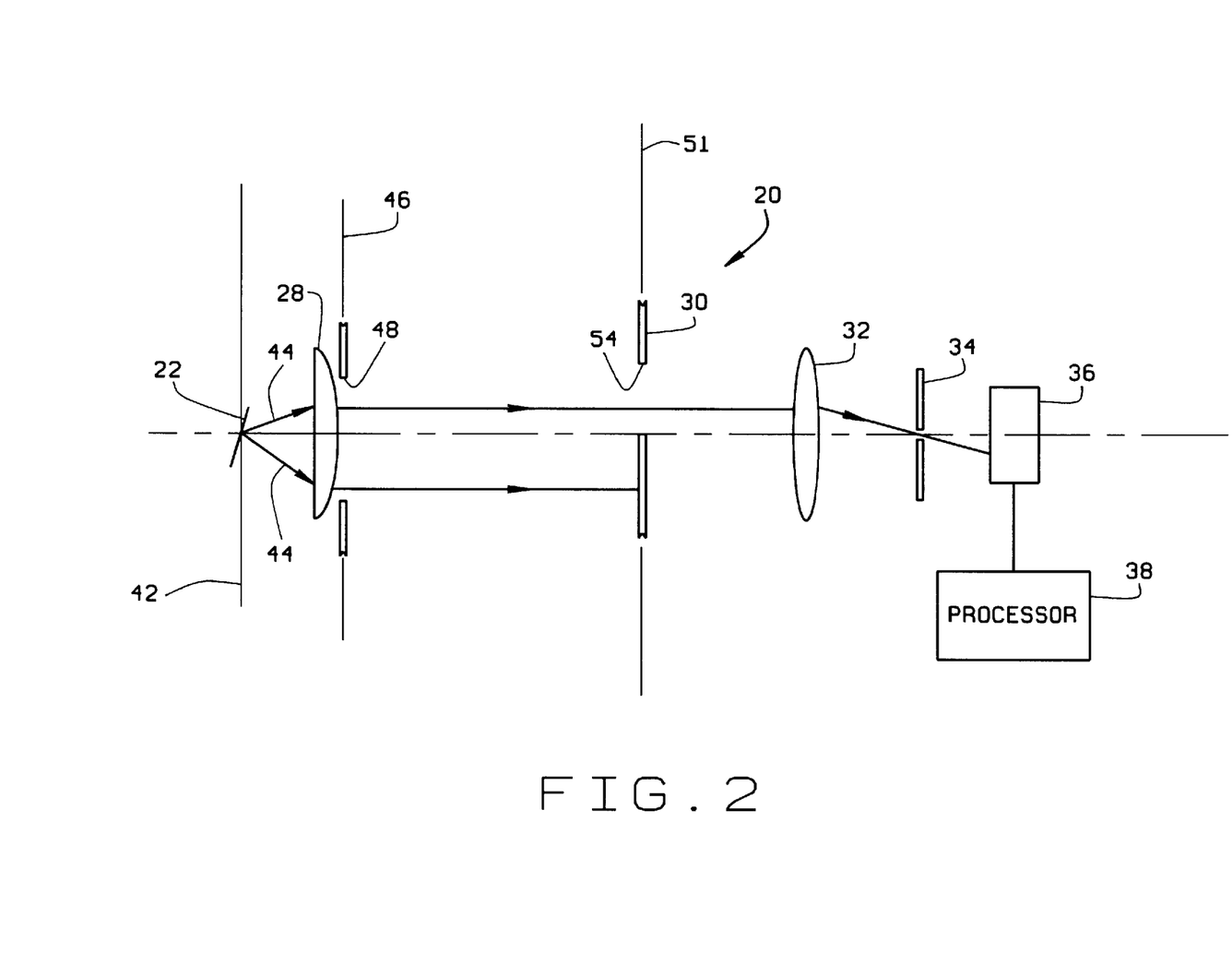
FIG. 2 is a schematic of the microscope of FIG. 1 showing a return path of light reflected off the object tile.

Generally speaking, the microscope analyzes thousands of minuscule portions of the surface of a specimen. Because these surface portions are so small relative to the size of the specimen, they are treated as though they are flat. The apparatus (microscope and processor) determines the approximate (representative) spatial slopes of the surface portions (or object tiles). A processor integrates the determined spatial slopes to generate a topographical map representative of surface portions of the specimen. For simplicity, only one object tile 22 is shown in FIGS. 1 and 2 and this tile appears to be large relative to the components of the microscope 20. However, it is to be understood that the object tile 22 is only one of perhaps thousands of object tiles of the specimen, and each object tile is microscopic.

The microscope 20 is shown schematically in FIGS. 1 and 2. It comprises a scanning/de-scanning mechanism 24, a beam splitter 26, an objective 28, a moving aperture 30, a relay lens 32, a confocal pinhole aperture 34, a light detector 36, and a processor 38. FIG. 1 illustrates an incident light path and FIG. 2 illustrates a return light path. For simplification in illustrating the return light path, the scanning/de-scanning mechanism 24 and beam splitter 26 have been omitted from FIG. 2. However, it is to be understood that the scanning/de-scanning mechanism 24 and beam splitter 26 are present during operation of the microscope 20.

Referring now to FIG. 1, incident light 40 is directed along the incident light path to the specimen via the beam splitter 26, scanning/de-scanning mechanism 24, beam splitter 26 and objective 28. Preferably, the scanning/de-scanning mechanism 24 comprises a raster scan (not shown) and suitable lenses (not shown) for serially directing a plurality of collimated incident light beams off the beam splitter 26 and through the objective 28 to serially illuminate different surface portions (object tiles) of the specimen. The objective 28 focuses the incident light beams onto the object tiles. The light beams (only one of which is shown in FIG. 1) emitted from the scanning/de-scanning mechanism 24 are directed to the objective 28 at different angles so that the beams are focused at different portions of the in-focus plane 42 of the objective 28. In other words, the scanning/de-scanning mechanism 24 serially directs incident light to a plurality of discrete regions of the in-focus plane 42 of the objective 28. In essence, the scanning/de-scanning mechanism 24 divides the in-focus plane 42 of the objective 28 into a plurality of grid regions 45 (e.g., 512×512 grid regions) and serially directs incident light to each grid region (note: grid regions and object tile are greatly enlarged in FIG. 1). If an object tile 22 of the specimen is in a grid region of the in-focus plane 42, then the incident light reflects off the object tile. Although the in-focus plane 42 is identified as a plane, it is to be understood that it actually has a thickness equal to the depth of focus of the objective 28. Likewise, each grid region has a thickness t (i.e., a distance from left to right as viewed in FIG. 1) preferably equal to the depth of focus of the objective 28.

Figure 3:
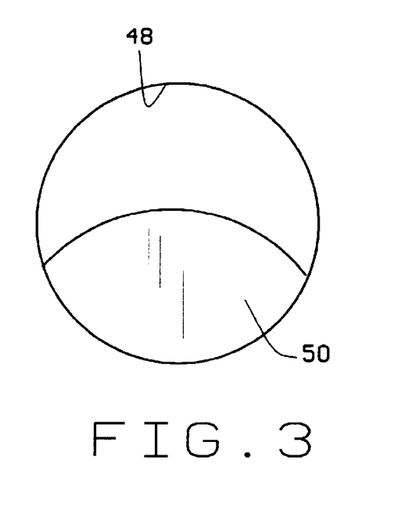
FIG. 3 shows a projection of the reflected light beam at the back focal plane of the objective of the microscope of FIG. 1, the projection representing a portion of the objective's exit pupil illuminated by the reflected light beam.

The approximate spatial slope of an object tile 22 is determined by analyzing the light beam reflected off such object tile. As shown in FIG. 2, the reflected light beam 44 is transmitted back through the objective 28, through the beam splitter 26, through the relay lens 32, through the confocal pinhole aperture 34 and to the light detector 36. The incident light beam 40 (FIG. 1) focused onto each object tile 22 has a particular shape. Preferably, the incident light beam is in the shape of a right-circular cone having its base at the objective 28, its apex at the in-focus plane, and its axis generally aligned with the optical axis. Because of the laws of reflection, the reflected light beam 44 will also be in the shape of a right-circular cone, but the position of its axis will depend on the spatial slope of the object tile 22. In general, the axis of the reflected light beam 44 will be at an angle equal to twice the tilt angle of the object tile 22. The reflected light will be projected onto the back focal plane 46 of the objective 28 (i.e., will illuminate a portion of the objective's exit pupil 48) only if the tilt angle is less than the NA (numerical aperture) angle of the objective 28. If the tilt angle is greater than the NA angle, then none of the reflected cone will return through the objective 28. Preferably the objective 28 has a large NA angle (e.g., 50° or larger) to maximize the range of slopes that can be detected by the microscope. FIG. 3 shows a projection 50 of the reflected light beam at the back focal plane 46 of the objective 28. This projection 50 represents the portion of the exit pupil 48 illuminated by the reflected beam 44 of light. Since the reflected light beam 44 is cone-shaped, the projection 50 will be a conic section (i.e., circle, ellipse, parabola, or hyperbola). The precise shape and position (i.e., orientation) of the projection 50 relative to the periphery of the exit pupil 48 is dependent upon the spatial slope of the object tile 22. As discussed in greater detail below, once the shape and position of the projection 50 is determined (or when characteristics of this shape and position are determined), then the spatial slope of the object tile 22 can be determined.

Preferably, characteristics of the shape and intensity of the light beam projection 50 sufficient to determine the spatial slope of the object tile are sensed by a single light detector, such as a single photodiode. A photodiode generally senses only the intensity of light striking the photodiode and not the orientation of the light striking the photodiode. However, by placing a masking element in a plane 51 (FIG. 2) conjugate to the back focal plane 46, the light intensity of different portions of the back focal plane can be analyzed.

Figure 4:
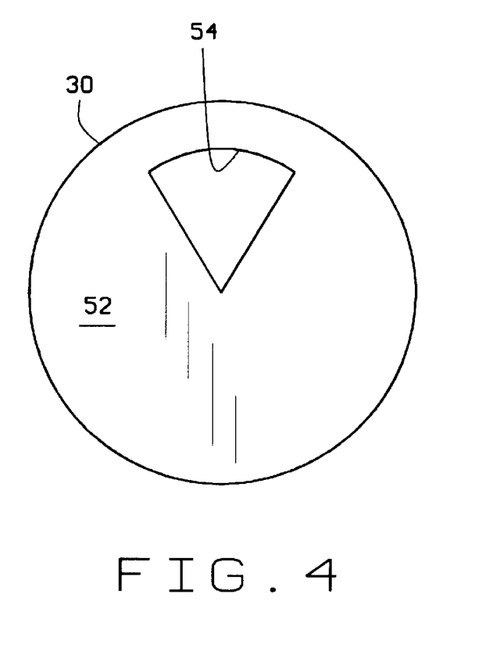
FIG. 4 is a front view of a moving aperture (i.e., masking element) of the microscope of FIG. 1.
Figure 5:
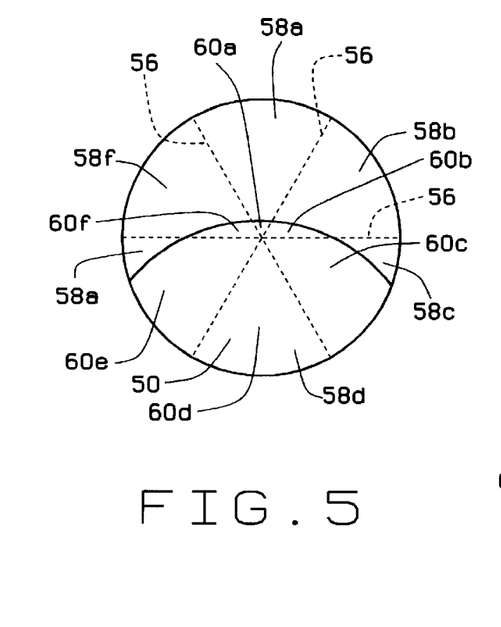
FIG. 5 represents the projection of the reflected light beam effectively divided into six area portions by rotating the masking element of FIG. 4 to six discrete positions, each area portion corresponding to an area of a conjugate back focal plane which is common to the aperture of the masking element for a given rotational position of the masking element.
Figure 6:
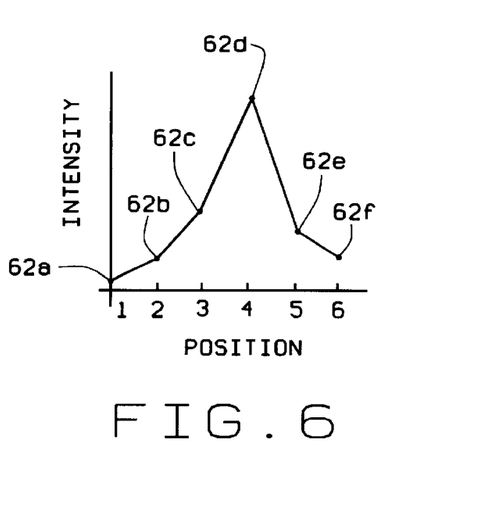
FIG. 6 is an intensity versus position diagram which represents the light intensity of the projected light beam common to each of the six area portions of FIG. 5. The intensity distribution is determined by the tilt, orientation, and numeric aperture of the objective.

Referring now to FIGS. 2 and 4, the moving aperture 30 (i.e., masking element) is preferably positioned in a plane 51 conjugate to the back focal plane 46 of the objective 28. Preferably, it includes a disc-shaped body 52 rotatable about the optical axis, and an offset aperture 54 through the disc shaped body. The disc-shaped body 52 is preferably opaque and the aperture 54 is preferably wedge-shaped. The disc-shaped body 52 masks (e.g., blocks) reflected light which would otherwise strike the light detector 36. Thus, only the portion of the reflected light beam 44 passing through the offset aperture 54 is permitted to strike the detector 36. The masking element 30 is rotated to move the aperture 54 to a plurality of positions (i.e., angular orientations) and the intensity of the portion of the reflected light beam passing through the aperture 54 is recorded at each of these positions. Preferably, the wedge angle of the offset aperture 54 is 60° and six different images are collected with the aperture at non-overlapping rotational positions. FIG. 5 represents the image of the back focal plane divided by radial lines 56 into six area portions 58a, 58b, 58c, 58d, 58e, 58f. Preferably, the diameter of the circle swept by the aperture 54 is at least as large as the diameter of the image of the exit pupil at the conjugate back focal plane 51. Each area portion corresponds to an area of the conjugate back focal plane 51 which is common to the aperture 54 of the masking element 30 for a given position of the masking element. For each of the six positions of the masking element 30, the detector 36 detects the light intensity of a projection portion 60a, 60b, 60c, 60d, 60e, or 60f (i.e., the portion of the projection 50 which is common to the corresponding area portion) and generates a light intensity signal 62a, 62b, 62c, 62d, 62f, or 62g representative of the light intensity of the projection portion. The six light intensity signals 62a, 62b, 62c, 62d, 62f, 62g associated with the six area portions 58a, 58b, 58c, 58d, 58e, 58f of FIG. 5 are depicted graphically in FIG. 6. The combined light intensity signals are representative of an intensity profile, e.g., the shape and position of the illuminated portion of the pupil of the objective.

Although the wedge angle of the pie-shaped aperture 54 is preferably 60°, it is to be understood that the aperture may have some other wedge angle, e.g. 180°, or some other shape without departing from the scope of this invention. It is also to be understood that different numbers of rotational positions of the masking element 30 could be employed without departing from the scope of this invention. Depending upon the shape and size of the aperture 54 and the number of different rotational positions, the area portions may overlap and/or may not combine to equal the area of the exit pupil. For example, if the aperture has a wedge angle of 180°, and the masking element is rotated to six positions spaced at 60° increments, then there will be significant overlap. Also, if the aperture is a pie-shaped wedge having a wedge angle of 30° and the masking element is rotated to six positions spaced at 60° increments, then the combined data collected by the detector 36 will represent only a fraction of the light intensity of the projection 50. However, this data is still sufficient to determine the approximate spatial slope of the object tile 22.

Preferably, a light intensity signal is collected on each of the object tiles before the aperture 54 is moved to another position. Thus, the aperture is required to be in each of its six positions only once to obtain the needed data on all of the object tiles in the grid regions. Preferably, the aperture 54 is moved to each of its positions via a suitable stepper motor (not shown).

A CCD, multiple photomultiplier tubes (PMT's), an image tube, or an intensifier may alternatively be used to obtain information about the structure of the exit pupil or of the conjugate back focal plane. The information obtained is essentially the same as when moving the detector with the advantage that no moving parts are necessary.

The light coming through the pinhole aperture that reaches the PMT has within it the spatial information to create a topographic map of the optical section being imaged. However, a single-PMT detector integrates all the incoming light. Adding a masking element in front of the detector that blocks all the light except for that reaching the detector from one direction (e.g. a pie-shaped wedge aperture) allows the detector to sample only the light from one orientation. By rotating the masking element as the scan device remains illuminating one specimen tile, the reflected light returning at a plurality of orientations may be sampled. As the rotation takes place the light intensity will vary in several ways. In the manner described above, these profiles (a stream of intensities as the aperture rotates) can be easily used to assess the orientation of the tile being illuminated. Thus, a rapid rotation of a pie-shaped aperture will give a data stream that can be analyzed to determine orientation and tilt angle. Other rotating aperture geometries with subtle advantages and disadvantages are also possible (e.g. parallel slit, half circle).

The mask may be placed in front of or behind the confocal aperture, but because diffraction at the confocal pinhole could potentially degrade the structure of the exit pupil, the preferred implementation samples the structure of the exit pupil at a plane in front of the confocal pinhole.

In either approach the number of detectors in the array does not determine the resolution of the resultant data. It is possible to obtain information about the tile tilt and orientation from only a few detectors or detector positions using computational methods.

Multiple confocal aperture scanning, such as the rotating disk scanning microscopes, may also be used for profilometry by placing the additional masking element in a plane conjugate to the back focal plane that is only on the return-light path behind the confocal apertures. Because the light from several points in the specimen is collected at the same time, this approach requires additional optics to form an image of the scanning disk into a spatially resolved detector (CCD camera, video camera, etc.). In this way the contributions from the different scanning spots are detected separately. This implementation has the advantage of permitting the use of a conventional mercury arc lamp for illumination instead of a laser. Also, diffraction at the pinholes in the light return path may be negligible.

It is to be understood that the above procedure for collecting the angular information may also be used with a multiple-aperture tandem scanning microscope (TSM) (not shown), in which the illumination and detection apertures are physically different. The confocal exit pupil mask is placed at a conjugate back focal plane behind the confocal apertures in the detection path. As with the tandem scanning microscope with the conjugate back focal plane-mask in front of the confocal apertures, a spatially resolved detector is placed either right behind the detection confocal apertures or at a plane conjugate to the plane of these apertures.

After the light intensity signals are collected for the object tiles of the specimen in the grid regions, the distance between the specimen and objective 28 are altered so that other surface portions of the specimen, which were previously outside the grid regions of the focal plane (i.e., previously outside the depth of focus of the objective) are brought within previously unoccupied grid regions of the in-focus plane. The light intensity signals are then again collected for the object tiles in the grid regions to obtain the necessary information on these newly occupied grid regions. The distance between the specimen and objective 28 is preferably altered to a sufficient degree and to a sufficient number of positions to obtain the necessary information for all surface portions of the specimen.

After the data are collected (i.e., after the light intensity signals are collected), the relationship between the spatial slope of the surface at the scanning spot and the measured data may be determined based either on optical principles or on measurements taken from a calibrated sample. This relationship may have the form of a mathematical expression or of a table of angles (or slopes) versus measurements. If the relationship is a mathematical expression, its analytic or numerical solution may be attempted. If the relationship is in the form of a table, its inversion may be accomplished by scanning the table to find the entry that best matches the measured quantities. It may also be inverted by using the measured quantities, properly scaled, as indices to a table. Another possible approach to invert the information from a table is to fit mathematical expressions for tilt and orientation as functions of the quantities to measure, then apply this expression to the recorded or measured quantities.

For simplicity, only the method of forming a table based on optical principles is discussed in detail below. However, it is to be understood that the other methods for determining the slope of the object tile may be employed without departing from the scope of this invention.

Figure 7:
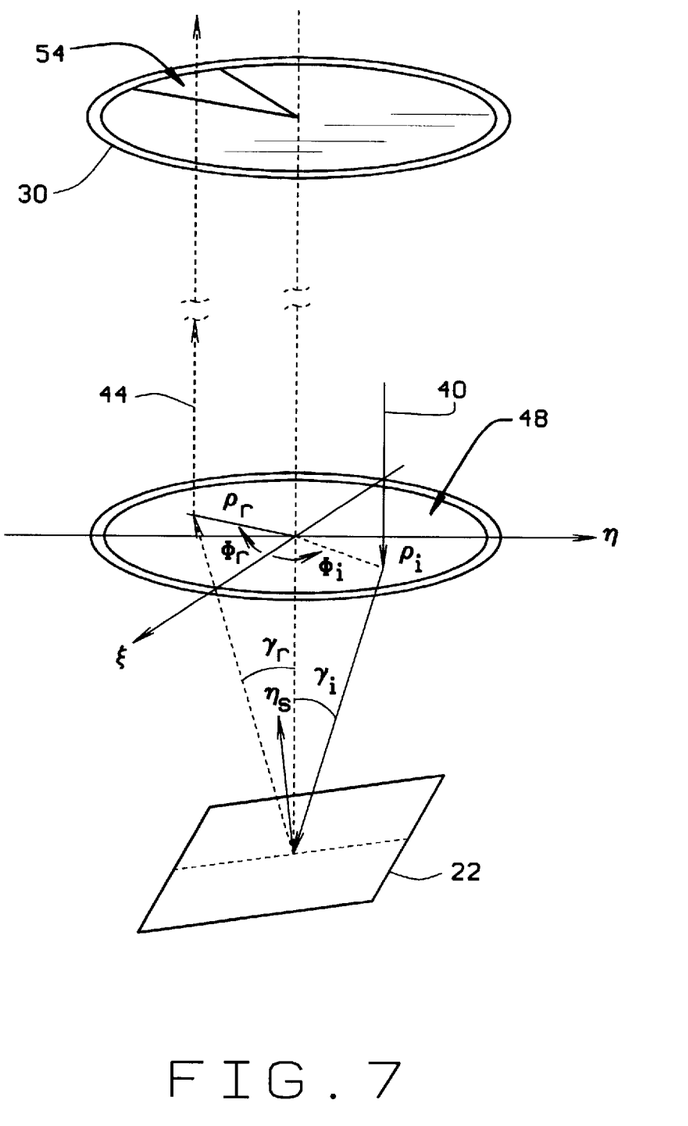
FIG. 7 is a perspective view showing the geometrical relationship between the incident and reflected light for the microscope of FIG. 1.

Referring now to FIG. 7, the relation between the incident and reflected rays is determined in a straightforward way using the laws of reflection and refraction. For simplicity, most of the components of the microscope 20 have been excluded from FIG. 7. When a scanning beam (i.e., incident light beam 40) illuminates the exit pupil ("ExP") 48 of the objective 28, all of the illumination rays that pass through the exit pupil focus into a spot in the reflecting specimen or object tile 22. In object space (i.e., on the specimen side of the objective) each ray has a tilt angle ($\gamma_i$) and an orientation angle ($\phi_i$) that depend on the portion of the exit pupil through which the ray passes. It is convenient to specify this location by its polar coordinates ($\rho_i$, $\phi_i$), where $\rho_1$ is the distance of the ray to the optical axis (or center of the exit pupil) normalized such that $\rho=1$ represents the rim of the exit pupil, and $\phi_i$ is the angular coordinate with respect to an arbitrary reference axis (e.g., the $\xi$ axis shown in FIG. 7) in the back focal plane. In object space, the orientation angle of the ray is directly related to this angular coordinate $\phi_i$. The tilt angle $\gamma_i$ is related to the radial coordinate and is given by:

$$\gamma_1 = \tan^{-1}[\rho_i \tan(\gamma_{NA})] \tag{1}$$

where $\gamma_{NA} = \sin^{-1}(NA/n)$, NA is the objective's numerical aperture, and n is the refractive index of the immersion medium (i.e., the medium between the objective and the specimen). The tilt angle $\gamma_r$ and the orientation angle $\phi_r$ of the reflected ray are dependent upon the tilt and orientation angles of the incident ray and of a normal $n_s$ to the reflecting tile, as predicted by the law of reflection (i.e. the angle of incidence is equal to the angle of reflection). A unit vector $k_i$ parallel to the illuminating ray is represented by:

$k_i = (\cos \alpha_i, \cos \beta_i, \cos \gamma_i) = -(\cos \phi_i \sin \gamma_i, \sin \phi_i \sin \gamma_i, \cos \gamma_i)$.

A unit vector n parallel to the normal of the reflecting surface is represented by:

$n = (\cos \alpha_s, \cos \beta_s, \cos \gamma_s) = (\cos \phi_s \sin \gamma_s, \sin \phi_s \sin \gamma_s, \cos \gamma_r)$ A unit vector parallel to the reflected ray is represented by:

$k_r = (\cos \alpha_r, \cos \beta_r, \cos \gamma_r) = (\cos \phi_r \sin \gamma_r, \sin \phi_r \sin \gamma_r, \cos \gamma_r)$.

The negative sign for the incident indicates that the ray propagates in the opposite direction from the reflected ray. Using the law of reflection, the unit vector parallel to the reflected ray is:

$$k_r = k_i - 2(k_i \cdot n)n,$$

where (k·n) is the dot product of k and n. Once $k_r$ is known, the tilt angle $\gamma_r$ can be obtained from the third component of this vector (cos $\gamma_r$) and the orientation $\phi_r$ angle from the expression:

$$\phi_r = \tan^{-1}\left(\frac{\cos\beta_r}{\cos\alpha_r}\right).$$

Also, the radial coordinate of the point where the reflect ray crosses the exit pupil is given by the expression:

$$\rho_r = \frac{\tan\gamma_R}{\tan\gamma_{NA}}.$$

The reflected ray thus found propagates through the optical system to the conjugate back focal plane aperture (i.e., the aperture 54 of the masking element 30), or equivalently, to a light detector that is physically or optically translated at a conjugate back focal plane (CBFP). The conjugate back focal plane aperture 54 may be located either in front or behind the confocal pinhole aperture. It is clear from FIGS. 5 and 7 that for each position of the detector or the conjugate back focal plane aperture 54, only a subset of the reflected rays are collected. The subset depends not only on the position of the detector or of the aperture in the conjugate back focal plane, but also on the tilt and orientation angles of the reflecting tile.

Diffraction may have a significant effect when the light propagates through distances that are long compared to the size of the exit pupil of the objective or to the conjugate back focal plane aperture 54. In these cases the Fresnel diffraction approximations usually hold. To calculate the light distribution in the diffracted field it is necessary to calculate the two-dimensional distribution of light intensity at the back focal plane or conjugate back focal plane of the objective. This calculation has two parts. First, the shape of the illuminated portion of the back focal plane (i.e. the reflected image of the exit pupil) must be found. Second, the light intensity $I_r(\xi_r, \eta_r)$ at each point $(\xi_r, \eta_r)$ in this illuminated portion must be determined.

As discussed above, the shape of the illuminated portion of the back focal plane or conjugate back focal plane must be a conic section because the reflected beam is a cone with its axis not necessarily parallel to the optical axis. The equation of this conic section can be found by first finding an equation that describes the reflected cone of light, for example in the form $f(\xi, \eta, z)=0$, and evaluating at the value of z corresponding to the back focal plane. There are many ways to obtain the equation of the reflected cone of light. However, the linear algebra approach is preferred because of the shorthand notation that it affords.

The equation of a circular cone with its axis parallel to the z-axis (i.e., optical axis) and angle $\gamma_{NA}$ is $$\xi^2 + \eta^2 - Z^2 \tan^2\gamma_{NA} = 0$$

which may be written in matrix notation as $$x^T Q x = 0$$

where $x = [\xi, \eta, z]^T$ is a point in three dimensional space, $[\;]^T$ denotes matrix transposition, and $$Q = \begin{bmatrix} 1 & 0 & 0 \\ 0 & 1 & 0 \\ 0 & 0 & -\tan^2\gamma_{NA} \end{bmatrix}. \tag{2}$$

The axis of symmetry of the reflected cone is the reflection of the chief ray (i.e., the illumination ray through the center of the exit pupil). From the law of reflection this ray has director cosines (sin $2\gamma_s$ cos $\phi_s$, sin $2\gamma_s$ sin $\phi_s$, cos $2\gamma_s$) where ($\gamma_s$, $\phi_s$) are the tilt and orientation angles of the reflecting tile. The reflected cone may be treated as having its axis of symmetry along the axis of a rotated coordinate system: $\tilde{x} = [\tilde{\xi}\;\tilde{\gamma}\;\tilde{z}]^T$. The equation of the reflected cone in these rotated coordinates is simply $$\tilde{x}^T Q \tilde{x} = 0 \tag{3}$$

with Q given by Equation (2). The relation between the x and $\tilde{x}$ vectors is given by $$\tilde{x} = Rx \tag{4}$$

where R is the coordinate rotation matrix given by $$R = \begin{bmatrix} \cos 2\gamma_s \cos\phi_s & \cos 2\gamma_s \sin\phi_s & -\sin 2\gamma_s \\ -\sin\phi_s & \cos\phi_s & 0 \\ \sin 2\gamma_s \cos\gamma_s & \sin 2\gamma_s \sin\phi_s & \cos 2\gamma_s \end{bmatrix}. \tag{5}$$

The equation of the reflected cone in the original coordinates obtained from Equations (3) and (4) is:

$$x^T R^T Q R x = 0. \tag{6}$$

To obtain the equation of the conic section formed by the intersection of this cone and the back focal plane (i.e., the projection 50 of the cone onto the back focal plane), Equation (6) is evaluated at the value of z corresponding to the back focal plane and then the resulting quadratic form is reduced to a two-dimensional quadratic in $r = (\xi, \eta)$. Because the coordinates are normalized such that $\rho = 1$ at the rim of the exit pupil 48, the back focal plane is at $z = \cot\gamma_{NA}$. This substitution and subsequent reduction of order gives:

$$[r + Q_{11}^{-1} Q_{12} \cot \gamma_{NA}]^T Q_{11} [r + Q_{11}^{-1} Q_{12} \cot \gamma_{NA}] = \cot^2\gamma_{NA}(Q_{12}^T Q_{11}^{-1} Q_{12} - q_{33}) \tag{7}$$

where $Q_{11}$, $Q_{12}$, and $q_{33}$ are a 2×2 symmetric matrix, a 2×1 matrix, or column vector, and a scalar, respectively, that result from partitioning $R^T Q R$ as:

$$R^T Q R = \begin{bmatrix} Q_{11} & Q_{12} \\ Q_{12}^T & q_{33} \end{bmatrix}.$$

The intensity of the illumination light $I_i(\xi_i, \eta_i)$ at a point $(\xi_i, \eta_i)$ in the exit pupil and the intensity at the reflection $(\xi_r, \eta_r)$ of this point are not equal. The reason is that an area element $dA_i = dA(\xi_i, \eta_i)$ and its reflection $dA_r = dA(\xi_r, \eta_r)$ are not of the same size. Thus, the light that covers $dA_i$ of the illumination, covers a different area $dA_r$ of the reflected light path. The ratio of the reflected intensity to the illumination intensity is therefore the ratio $dA_i/dA_r$. The relation between the locations of the incident and reflected rays in the back focal plane are denoted by $\xi_i = \xi_i(\xi_r, \eta_r)$ and $\eta_i = \eta_i(\xi_r, \eta_r)$. The ratio of areas is:

$$\frac{dA_i}{dA_r} = |J(\xi_r, \eta_r)|,$$

-continued where $$J(\xi_r, \eta_r) = \frac{\partial(\xi_i, \eta_i)}{\partial(\xi_r, \eta_r)} = det \begin{bmatrix} \frac{\partial \xi_i(\xi_r, \eta_r)}{\partial \xi_r} & \frac{\partial \eta_i(\xi_r, \eta_r)}{\partial \xi_r} \\ \frac{\partial \xi_i(\xi_r, \eta_r)}{\partial \eta_r} & \frac{\partial \eta_i(\xi_r, \eta_r)}{\partial \xi \eta_r} \end{bmatrix}$$

is the Jacobian of the relation between the incident and reflected ray locations. The relations $\xi_i = \xi_i(\xi_r, \eta_r)$ and $\eta_i = \eta_i(\xi_r, \eta_r)$ may be found as described above. Thus the intensity of the reflected light in the back focal plane or conjugate back focal plane is:

$$I_r(\xi_r, \eta_r) = \begin{cases} I_i[\xi_i(\xi_r, \eta_r), \eta_i(\xi_r, \eta_r)]|J(\xi_r, \eta_r)| & \text{for } (\xi_i, \eta_i) \in ExP \\ 0 & \text{otherwise} \end{cases} \quad (8)$$

To calculate the tilt and orientation angles ($\gamma_s$, $\phi_s$) of each object tile or pixel ($x_s$, $y_s$) in the specimen, a series of measurements $\{I_j(x_s, y_s); j=0, 1, \ldots, N_d-1\}$ is collected by moving the detector 36 or the conjugate back focal plane aperture 54 to $N_d$ different positions. Once the measurements have been collected, the theory developed above may be used to obtain the tilt and orientation angles ($\gamma_s$, $\phi_s$) for each pixel ($x_s$, $y_s$) in the specimen. This inverse problem may be addressed in any one of several possible ways. Some of the methods are: 1) finding two analytic expressions or functions $\phi_r = \phi(I)$ and $\gamma_r = \Gamma(I)$ for $I = \{I_0, I_1, \ldots, I_{Nd-1}\}$ and simply substituting the recorded intensities; 2) Finding $N_d$ analytic expressions or functions $I_j = I_j(\gamma_s, \phi_s)$ that relate the $N_d$ intensities to the recorded angles and solving them numerically for ($\gamma_s$, $\phi_s$); 3) finding calibration curves or look up tables (LUT), e.g., a table of the light intensity collected at each conjugate back focal plane aperture position or detector position for each combination of tilt and orientation angle of the reflecting tile; 4) finding approximate expressions or functions $\phi_r = \phi(I)$ and $\gamma_r = \Gamma(I)$ for $I = \{I_0, I_1, \ldots, I_{Nd-1}\}$ and substituting the recorded intensities. The look up table may be an auxiliary step in finding these two functions.

The look up table may be obtained from theoretical computation or from experimental measurement from a calibrated target.

In the experimental method, a reflecting surface whose tilt and orientation angles can be precisely controlled is set under the microscope and then the intensity for each position of the detector or conjugate back focal plane aperture is recorded for a number of combinations of tilt and orientation angles.

In the theoretical approach, the laws of reflection and refraction and diffraction theory are used to predict the intensities collected at each position of the detector or the conjugate back focal plane aperture. This calculation is done for a number of combinations of tilt and orientation angles of the reflecting tile. The look up table may be calculated from closed form expressions that relate the intensities at each position of the detector or conjugate back focal plane aperture to the tilt and orientation angles. Alternatively, it may be calculated numerically in the following way:

i) partition the exit pupil into small area elements $\{\Delta a_i; i=1, 2, \ldots, N_a\}$;

ii) assign a tilt angle $\gamma_s$ and orientation angle $\phi_s$ to the reflecting tile;

iii) clear one accumulator $\{I_j(\gamma_s, \phi_s); j=0, 1, \ldots, N_d-1\}$ for each one of the $N_d$ positions of the detector or conjugate back focal plane aperture;

iv) for an area element $\Delta a_i$, calculate the intensity $I(\xi_i, \eta_i)$ of the illumination at a point ($\xi_i$, $\eta_i$) within the area element;

v) calculate the tilt and orientation angles $\gamma_i$, $\phi_i$ in object space for an illumination ray passing through ($\xi_i$, $\eta_i$) in the exit pupil;

vi) with ($\gamma_i$, $\phi_i$) and ($\gamma_s$, $\phi_s$), using the law of reflection calculate the tilt and orientation angles $\gamma_r$, $\Phi_r$ of the reflected surface;

vii) with ($\gamma_r$, $\phi_r$), find the position(s) of the detector or conjugate back focal plane aperture where the reflected rays are detected;

viii) Add $\Delta a_i I(\xi_i, \eta_i)$ to the intensity detected at the position(s) found in Step vii;

ix) repeat steps iv to viii for all area elements $\{\Delta a_i; i=1, 2, \ldots, N_a\}$ in the exit pupil;

x) if the intensities $\{I_j(\gamma_s, \phi_s); j=0, 1, \ldots, N_d-1\}$ computed in steps iv to ix are not all equal to zero, normalize the set of intensities to add to 1.0 (if all $N_d$ intensities are zero, the tilt angle $\gamma_s$ of the reflecting surface is larger than or equal to the maximum angle collected by the objective, $\gamma_{NA}$ and none of the reflected rays pass through the exit pupil); and xi) repeat Steps ii to x for all angles $0 \leq \phi_s < 2\pi$ and $0 \leq \gamma_s < \gamma_{NA}$.

The result of this process is a three-dimensional array of intensities:

$$\{I_j(\gamma_s, \phi_s);$$

$$j=0, 1, \ldots, N_d-1, 0 \leq \phi_s < 2\pi, 0 \leq \gamma_s < \gamma_{NA}\}$$

normalized such that $$\sum_{j=0}^{N_d-1} I_j(\phi_s, \gamma_s) = 1 \quad \forall (\phi_s, \gamma_s)$$

Some geometries for the conjugate back focal plane aperture (or detector aperture) allow for simplifications in the calculation of the look up table, in particular when the illumination intensity is circularly symmetric, i.e. $I(\xi, \eta) = I(\rho)$, with $\rho^2 = \xi^2 + \eta^2$. If illumination is circularly symmetric and the conjugate back focal plane aperture is wedge-shaped with angle $\theta_w$, i.e. for $\phi_0 \leq \phi_s < \phi_0 + \theta_w$ for some arbitrary value of $\phi_0$, then the intensities $I_j(\xi_s, \eta_s)$ for the rest of the [0, 2, $\pi$) interval are rotations of the intensities in the [$\phi_0$, $\phi_0 + \theta_w$) interval. In other words, the $N_d$ intensities $\{I_j(\phi_s, \gamma_s); j=0, 1, \ldots, N_d-1\}$, for an orientation angle $\phi_s \notin [\phi_0, \phi_0 + \theta_w)$ can be found from the intensities in the [$\phi_0$, $\phi_0 + \theta_w$] interval by some rotation of the aperture position index j and orientation angle as:

$$I_j(\phi_s, \gamma_s) = I_{(j+k) \bmod N_d}(\phi_s + \alpha, \gamma_s) \quad (9)$$

for some k and $\alpha$ that depend on $\theta_w$, $\phi_0$, and possibly on $N_d$, but not on $\phi_s$ or $\gamma_s$. In Equation (9) the angle $\phi_s + \alpha$ is in the interval [$\phi_0$, $\phi_0 + \theta_w$).

In practice, the optical path lengths between the different components in the optical system may be long compared to the size of the apertures involved. For example, the distance from the objective 28 to the pinhole aperture 34 could be at least an order of magnitude larger than the diameter of the exit pupil of the objective. In these cases diffraction has a significant effect on the distribution of light at different planes of interest. In the embodiment of FIGS. 1 and 2, the masking element (i.e., moving aperture 30) is at a conjugate back focal plane in front of the confocal pinhole aperture 34. In this embodiment the distance from the objective 28 to the moving aperture 30 is several times larger than the diameter of the objective's exit pupil 48 to allow enough room for the scanning/de-scanning mechanism 24 and the beam splitter 26 that bring the illumination into the objective's back focal plane 46. Also, the distance from the relay lens 32 to the pinhole aperture 34 is large compared to the diameter of the exit pupil of the objective 28 and relay lens 32. In such cases diffraction effects have to be taken into account to calculate the look up table. In the calculation proposed here, it is assumed that the tilt and orientation angles of the reflecting specimen do not change significantly within the size of the diffraction limited illumination spot. The look up table is calculated as follows:

i) assign a tilt $\gamma_s$ and orientation $\phi_s$ to the reflecting tile;

ii) using Equation (8), calculate the reflected light intensity $I_r(\xi_r, \eta_r)$ in the ExP;

iii) use diffraction theory to calculate the optical disturbance $U_{c-}(\xi, \eta)$ in front of the conjugate back focal plane aperture;

iv) for a given position j of the conjugate back focal plane aperture, calculate the optical disturbance $U_{c+}(\xi, \eta)$ behind the conjugate back focal plane aperture: $U_{c+}(\xi, \eta) = U_{c-}(\xi, \eta)$ for $(\xi, \eta)$ within the transparent part of the aperture, and $U_{c+}(\xi, \eta) = 0$ for $(\xi, \eta)$ within the opaque part of the aperture;

v) use diffraction theory to calculate the optical disturbance $U_{L-}(\xi, \eta)$ in front of the relay lens 32;

vi) multiply $U_{L-}(\xi, \eta)$ by the phase factor introduced by the lens to obtain the optical disturbance $U_{L-}(\xi, \eta)$ behind the lens;

vii) use diffraction theory to calculate the optical disturbance $U_{P-}(\xi, \eta)$ in front of the confocal pinhole aperture;

viii) multiply $U_{P-}(\xi, \eta)$ by the confocal aperture pupil function $U_c(\xi, \eta)$ to obtain the optical disturbance $U_{P+}(\xi, \eta)$ behind the pinhole aperture;

ix) integrate the intensity of the optical disturbance $U_{P+}(\xi, \eta)$ behind the pinhole aperture and assign the intensity to $I_j(\phi_s, \gamma_s)$;

x) repeat Steps iv to ix for each position of the conjugate back focal plane aperture j=0, 1, . . . , $N_d$–1;

xi) if the intensities $\{I_j(\gamma_s, \Phi_s); j=0, 1, \ldots N_d-1\}$ computed in steps iv to x are not all equal to zero, normalize the set of intensities to add to 1.0;

xii) repeat steps i to xi for all angles $0 \leq \phi_s < 2\pi$ and $0 \leq \gamma_s < \gamma_{NA}$.

As with the geometrical optics approach the result is a three-dimensional array of intensities:

$$\{I_j(\gamma_s, \Phi_s);$$

$$j=0, 1, \ldots, N_d-1, 0 \leq \Phi_s < 2\pi, 0 \leq \gamma_s < \gamma_{NA}\}$$

normalized such that $$\sum_{j=0}^{N_d-1} I_j(\phi_s, \gamma_s) = 1 \quad \forall (\phi_s, \gamma_s).$$

The simplifications afforded by certain conjugate back focal plane-aperture geometries and illumination symmetries for the geometric optics approach can also be exploited when diffraction effects are important.

In an alternative embodiment (not shown), the moving aperture is at a conjugate back focal plane behind the confocal pinhole aperture. The calculation of the look up table is very similar to the one described for the case of a moving aperture in front of the confocal pinhole. That is, the light distribution $U_d(\xi, \eta)$ in front of the light detector has to be calculated from the light distribution $I_r(\xi, \eta)$ in the back focal plane of the objective taking into account the diffraction effects from one plane of interest to the next. In this setup the size of the confocal pinhole aperture is an important design parameter. If the confocal aperture is too large, it will not prevent out-of-focus light from reaching the detector. If, on the other hand, it is too small, diffraction effects will distort the structure of the conjugate back focal plane to the point of practically losing the information about the tilt and orientation angles of the reflecting specimen.

After the look up table (LUT) is developed, it can be used to obtain the spatial slope (i.e., tilt and orientation) for each measured image. For example, the look up table may be scanned to find the value(s) closest to the measured intensity associated with each object tile.

The look up table may also be used to derive approximate expressions for tilt and orientation in terms of the intensities, i.e., to approximate two functions $\phi_r = \Phi(I)$ and $\gamma_r = \Gamma(I)$ for $I = \{I_o, I_1, \ldots, I_{Nd-1}\}$. Possible approaches for obtaining these functions include: (1) least squares fit of arbitrary functions (using singular value decomposition or not); (2) polynomial interpolation (or interpolation using an arbitrary set of functions); and (3) Minimax (Chevyshev) theory.

After being calculated, the spatial slopes of the object tiles are integrated to form a topographical map of the reflecting surface. The slopes have to be calculated in at least two directions, preferably mutually orthogonal (e.g., horizontal and vertical directions). If the slopes at column i, row j of the image are $$g_{i,j} = \frac{\partial z}{\partial x}\bigg|_{(i,j)} \text{ and } h_{i,j} = \frac{\partial z}{\partial y}\bigg|_{(i,j)},$$

then, to a first-order approximation, the height z at pixel (i, j) can be calculated either as $$z_{i,j} \approx z_{i-1,j} + \Delta x g_{i-1,j} \tag{10}$$

or as $$z_{i,j} \approx z_{i,j-1} + \Delta y h_{i,j-1} \tag{11}$$

where $\Delta x$ and $\Delta y$ are the pixel sizes in the horizontal and vertical directions. Because of the integrability problem, Equations (10) and (11) will seldom give the same value for $z_{i,j}$. One cause of the integrability problem is that Equations (10) and (11) are first order approximations that are exact only if the reflecting surface is a plane or if $\Delta x$ and $\Delta y$ approach zero. Another cause is that, even when Equations (10) and (11) are exact, there is measurement noise and thus the slopes $g_{i,j}$ and $h_{i,j}$ are never exact. Using only either Equation (10) or Equation (11), does not work around the integrability problem. For example, suppose that Equation (10) is used to calculate the surface height along two adjacent rows, j and j+1 each with $N_x$ pixels. Each pixel height $z_{i+1,j}$ is calculated from its immediately preceding neighbor $z_{i,j}$. If $z_{i,j}$ has some error, $z_{i+1,j}$ will have the cumulative effects of this error and any error resulting from Equation (10) (either from measurement error or from using a first order approximation). Likewise $z_{i+2,j}$ will have the cumulative effects of errors in $z_{i+1,j}$, $z_{i,j}$, $g_{i+1,j}$, and $g_{i,j}$. This error accumulation propagates all across row j, and thus $Z_{Nx,j}$ will have the accumulated error of all other pixels in the row. Likewise, $Z_{Nx,j+1}$ will have the accumulated error of all other pixels in row j+1. Because the errors at each row are likely to be different and because of the cumulative effect of the errors, the final pixel heights in rows j and j+1, $z_{Nx,j}$ and $z_{Nx,j+1}$, are likely to be significantly different.

Another drawback of line-by-line integration of the slopes is that in a typical image there are a large number of dark pixels. These pixels correspond to portions of the specimen that either are out of focus or have tilt angles larger than $\gamma_{NA}$. Out-of-focus pixels are dark because most of the light reflected off these pixels is masked by the confocal aperture. Pixels with tilt angles larger than $\gamma_{NA}$ reflect all the light at angles larger than $\gamma_{NA}$, and thus all the light reflected off these pixels misses the objective's exit pupil. The out-of-focus pixels may not be a problem if enough optical slices are collected to include the whole depth of the specimen. Unfortunately, pixels with large tilt angles are out of the range of measurable slopes and they appear dark in all optical sections. At the dark pixels, the tilt and orientation information is missing and thus the assumption that each pixel is connected to its next neighbor is violated. Line-by-line integration can be applied only if the image region is simply-connected and "convex", i.e., if the image region does not have holes or gulfs. Even in those cases, adjacent lines can have similar topography only if the region is a two-dimensional interval, i.e. a rectangular region of the collected image. For an arbitrary simply-connected convex region, however, the height along one line is very likely to be significantly offset relative to the adjacent lines because they have different starting points.

To avoid the integrability problem and to be able to obtain topographical maps of non-convex regions, the surface profile is calculated using a least squares approach. For multiple-connected regions, the topographical map of each one of the simply-connected image regions or islands is calculated. For each island $I_n$ the sum of squared errors is defined as $$\epsilon = \sum_{(i,j) \in I_n} \{(z_{i-1,j} + \Delta x g_{i-1,j} - z_{i,j})^2 + (z_{i,j-1} + \Delta y h_{i,j-1} - z_{i,j})^2\} \quad (12)$$

and a set of surface heights ($z_{i,j}$) is found that makes E a minimum. To obtain this minimum we follow the standard procedure of setting $$\frac{\partial \epsilon}{\partial z_{i,j}} = 0 \forall (i,j) \in I_n \quad (13)$$

and solving for $z_{i,j}$. Equation (13) leads to a linear system of equations of the form $$Az = h \quad (14)$$

where A is an N×N matrix of constant coefficients, z is a vector containing the N surface heights $z_{i,j}$ in lexicographical ordering, h is an N-element vector whose elements depend on $g_{i,j} \Delta x$ and $h_{i,j} \Delta y$, and N is the number of pixels in the image island. The slopes provide information about the height of a pixel relative to its neighbors, thus in Equation (14) there is one pixel height that can be arbitrarily chosen.

Equation (14) can be solved using any one of a number of numerical methods. For any practical image size, however, the number of pixels, N, is very large and the size of matrix A is impractically large. For example, a small 128×128 image, (i.e. an image with 128 rows and 128 columns) N may be up to 16,384 pixels, and a typical 512×512 image may have as many as 262,144 pixels. However, A is a scarce matrix with at most 5 non-zero elements per row. This is because in Equation (12) each pixel $z_{ij}$ depends only on its immediate neighbors $z_{i\pm 1, j\pm 1}$, and each pixel can have at most four immediate neighbors (boundary pixels have less than four neighbors). Because A is a scarce matrix, iterative methods to solve Equation (14) have small per-iteration computational complexity and thus such methods are chosen to solve this equation. In particular, the Gauss-Seidel iteration method is employed to solve Equation (14) for z. For Equation (12), this simply means that $z_{i,j}^{(k+1)}$ is the average of all possible ways to calculate the height at pixel (i, j) using a first order approximation given the heights of its immediate neighbors at iteration k or (k+1). For example, if pixel (i, j) is an interior pixel, it has four immediate neighbors that are image pixels, and thus there are four possible ways to calculate the height of pixel (i, j), namely from the left, from the right, from above, and from below. This gives $$z_{i,j}^{(k+1)} = \frac{1}{4} \ [(z_{i-1,j}^{(k+1)} + \Delta x g_{i-1,j}) + (z_{i+1,j}^{(k)} - \Delta x g_{i+1,j}) + \quad (15)$$

$$(z_{i,j-1}^{(k+1)} + \Delta y h_{i,j-1}) + (z_{i,j+1}^{(k)} - \Delta y h_{i,j+1})].$$

Similar equations are easily derived for other classes of pixels. These equations may be cast in the general form $$z_{i,j}^{(k+1)} = \frac{1}{w_{i-1,j} + w_{i+1,j} + w_{i,j-1} + w_{i,j+1}} \times \quad (16)$$

$$w_{i-1,j}(z_{i-1,j}^{(k+1)} + \Delta x g_{i-1,j}) + w_{i+1,j}(z_{i+1,j}^{(k)} - \Delta x g_{i+1,j}) +$$

$$w_{i,j-1}(z_{i,j-1}^{(k+1)} + \Delta y h_{i,j-1}) + w_{i,j+1}(z_{i,j}^{(k)} - \Delta y h_{i,j+1})$$

where $$w_{i,j} = \begin{cases} 0 \text{ if } (i,j) \text{ is a dark pixel} \\ 1 \text{ otherwise.} \end{cases}$$

Figure 8:
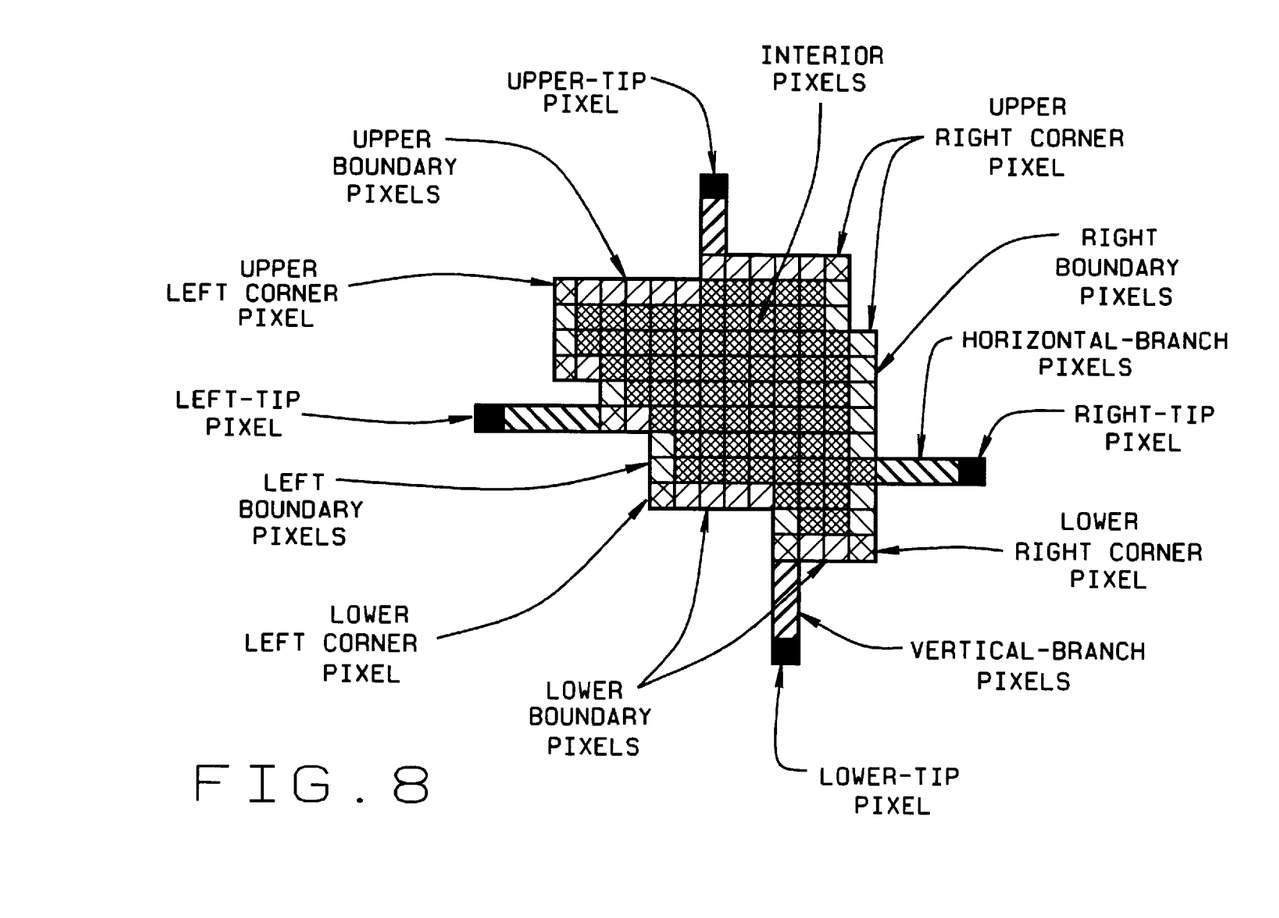
FIG. 8 is a drawing of an image island showing the fifteen non-trivial classes of pixels.

Implementation of Equation (16) as written above is inefficient for computational purposes due to the large number of trivial multiplications (by zero or by 1, 0). A more efficient computation results if, before solving Equation (14), the pixels in an image island are classified according to the possible ways to calculate $z_{i,j}$, that is according to the number and location of their non-dark immediate neighbors. Then a different equation is used for each class of pixel. Because each pixel in an island may have up to four non-dark neighbors, there are sixteen possible classes of pixels. From these, there is a trivial class that has zero non-dark neighbors because the island consists of a single pixel. In this case, the pixel height cannot be computed relative to any other pixel. For an isolated pixel, the denominator in Equation (16) is exactly zero and computation of the pixel height is therefore not possible. The remaining fifteen non-trivial classes of pixels are shown in FIG. 8. Once the pixels in an island are classified, the first pixel of the island is selected such that in a raster scan of all the pixels in the island, this will be the first pixel scanned. This is either an upper-tip pixel (See FIG. 8) or an upper-right corner pixel. Then Equation (16) is applied in a raster scan for all pixels in the island. One visit to all pixels completes an iteration. The iteration is repeated until the change in pixel height from one iteration to the next is arbitrarily small.

Even with the more efficient implementation used for Equation (16), the Gauss-Seidel method has a slow global convergence rate. To accelerate its convergence rate we use the standard method of successive over relaxation (SOR). Equation 16 thus becomes:

$$z_{i,j}^{(k+1)} = (1 - \omega)z_{i,j}^{(k)} + \frac{\omega}{w_{i-1,j} + w_{i+1,j} + w_{i,j-1} + w_{i,j+1}} \times \quad (17)$$

$$w_{i-1,j}(z_{i-1,j}^{(k+1)} + \Delta x g_{i-1,j}) + w_{i+1,j}(z_{i+1,j}^{(k)} - \Delta x g_{i+1,j}) +$$

$$w_{i,j-1}(z_{i,j-1}^{(k+1)} + \Delta y h_{i,j-1}) + w_{i,j+1}(z_{i,j}^{(k)} - \Delta y h_{i,j+1})$$

where $\omega$ is the overrelaxation factor. For stability $0<\omega<2$. The SOR method accelerates the global convergence by an order of magnitude, however, the local convergence rate varies greatly across the pixels in an island. Pixels that are close to the first pixel reach their final value much faster than pixels that are farther from this first pixel. To accelerate the local convergence rate, the direction of the raster scan is alternated between iterations, by the alternating-direction iterative (ADI) method. In each iteration of this method the direction of the raster scan is changed. In the first iteration the raster scan is performed line by line from left to right and top to bottom, the second iteration is also line by line but from right to left and bottom to top, in the third iteration the raster scan is done column by column from top to bottom and from left to right, in the fourth iteration the raster scan is done also column by column but from bottom to top and from right to left. This pattern of four raster scan directions is then repeated for all subsequent iterations. Simplified versions of this method are possible which use only two (or three) directions for the raster scan, however, the local convergence rate is faster with this four-directional ADI implementation.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense. The invention therefore shall be limited solely by the scope of the claims set forth below.

What is claimed is:

1. A method of generating an image of a specimen comprising:
    dividing the in-focus plane of an objective of a confocal microscope into a plurality of discrete regions;
    directing incident light to the discrete regions to illuminate surface portions of the specimen that are within the discrete regions;
    sensing light reflected from said surface portions;
    determining an approximate spatial slope of each surface portion associated with each discrete region; and
    integrating said determined spatial slopes to generate a topographical map representative of surface portions of the specimen that are within the depth of focus of the objective.

2. A method as set forth in claim 1 wherein the discrete regions of the in-focus plane of the objective are of a thickness substantially equal to the depth of focus of the objective.

3. A method as set forth in claim 1 wherein the step of directing incident light to the discrete regions comprises directing separate beams of incident light to the regions so that said reflected light comprises separate beams, the beams of reflected light corresponding to the surface portions of the specimen.

4. A method as set forth in claim 1 wherein the step of directing light to the discrete regions comprises serially directing light to each discrete region to separately illuminate each surface portion within a corresponding one of the discrete regions.

5. A method as set forth in claim 1 wherein the approximate spatial slope of each surface portion is determined by:
    generating at least one signal representative of an intensity profile associated with light reflected off said each surface portion; and
    applying known values to said at least one generated signal.

6. A method as set forth in claim 5 wherein applying known values to said at least one generated signal comprises comparing said at least one generated signal to one of a plurality of known values, each known value being associated with light reflected from a surface of known spatial slope.

7. A method as set forth in claim 1 wherein the step of sensing reflected light comprises sensing an intensity profile associated with the shape and position of a projection of at least a portion of the reflected light onto a particular area of a given plane.

8. A method as set forth in claim 7 wherein said particular area of said given plane comprises a plurality of area portions, and wherein sensing an intensity profile associated with the shape and position of said projection comprises generating a plurality of signals, each of which is representative of an area common to said projection and to one of said plurality of area portions.

9. A method as set forth in claim 8 wherein said plurality of signals are generated by a single light sensor.

10. A method as set forth in claim 7 wherein sensing an intensity profile associated with the shape and position of said projection comprises:
    positioning a masking element relative to said given-plane so that a portion of said particular area of said given plane is masked and another portion of said particular area is unmasked, said masking element being configured such that movement of the masking element varies the portion of said particular area which is unmasked;
    moving the masking element to a plurality of discrete positions relative to said given plane, a plurality of unmasked area portions of said particular area of said given plane corresponding to the plurality of discrete positions of the masking element; and
    generating a plurality of signals, each signal being representative of an area which is common to said projection and to the unmasked area portion associated with each of said positions of the masking element.

11. A method of generating an image of a specimen comprising:
    dividing the in-focus plane of an objective of a confocal microscope into a plurality of grid regions;
    positioning the specimen a distance from the objective of the optical apparatus so that surface portions of the specimen are within the grid regions of the in-focus plane;
    directing incident light to the grid regions to illuminate the surface portions of the specimen that are within the grid regions;
    sensing light reflected from said surface portions to determine approximate spatial slopes of each surface portion associated with each grid region;
    altering the distance between the specimen and objective so that other surface portions of the specimen, which were previously outside the grid regions of the focal plane, are within previously unoccupied grid regions of the in-focus plane;
    directing incident light to the grid regions to illuminate said other surface portions of the specimen that are within said previously unoccupied grid regions;
    sensing light reflected from said other surface portions to determine approximate spatial slopes of each of said other surface portions associated with each of said previously unoccupied grid regions; and
    integrating said determined spatial slopes to generate a topographical map representative of surface portions of the specimen.

12. A method as set forth in claim 11 wherein the approximate spatial slope of each surface portion is determined by:

generating at least one signal representative of a characteristic associated with light reflected off said each surface portion; and applying known values to said at least one generated signal.

13. A method as set forth in claim 12 wherein applying known values to said at least one generated signal comprises comparing said at least one generated signal to one of a plurality of known values, each known value being associated with light reflected from a surface of known spatial slope.

14. A method of approximating a spatial slope of a surface portion of a specimen comprising:

directing incident light along an incident light path of a confocal microscope to said surface portion of the specimen to reflect light from said surface portion;

sensing a characteristic associated with said reflected light; and applying the sensed characteristic to values relating to spatial slope.

15. A method as set forth in claim 14 wherein sensing a characteristic associated with said reflected light comprises sensing an intensity profile associated with said reflected light.

16. A method as set forth in claim 15 wherein said values comprise a plurality of known characteristics, each of said known characteristics being associated with reflection of light from a surface of known spatial slope, and wherein the step of applying the sensed characteristic comprises matching the sensed intensity profile to one of said known characteristics.

17. A method as set forth in claim 15 wherein the step of directing light comprises directing incident light of a particular shape and direction to said surface portion so that said reflected light is of a particular shape.

18. A method as set forth in claim 17 wherein the step of sensing an intensity profile associated with said reflected light comprises sensing an intensity profile associated with the shape and position of a projection of at least a portion of the reflected light onto a particular area of a given plane.

19. A method as set forth in claim 18 wherein said particular area of said given plane comprises a plurality of area portions, and wherein sensing an intensity profile associated with the shape and position of said projection comprises generating a plurality of signals, each of which is representative of an area common to said projection and to one of said plurality of area portions.

20. A method as set forth in claim 19 wherein said plurality of signals are generated by a single sensor.

21. A method as set forth in claim 18 wherein sensing an intensity profile associated with the shape and position of said projection comprises:

positioning a masking element relative to said given plane so that a portion of said particular area of said given plane is masked and another portion of said particular area is unmasked, said masking element being configured such that movement of the masking element varies the portion of said particular area which is unmasked;

moving the masking element to a plurality of discrete positions relative to said given plane, a plurality of unmasked area portions of said particular area of said given plane corresponding to the plurality of discrete positions of the masking element; and generating a plurality of signals, each signal being representative of an area which is common to said projection and to the unmasked area portion associated with each of said positions of the masking element.

22. A method as set forth in claim 20 wherein the step of applying the sensed characteristic to values relating to spatial slope comprises applying the generated signals to values relating to spatial slope.

23. A method as set forth in claim 22 wherein said values comprise a plurality of known values, each known value being associated with reflection of light from a surface of known spatial slope, and wherein the step of applying the generated signals comprises matching the generated signals to one of said known values.

24. A method of generating a topographical image of a specimen, said method comprising the steps of:

directing incident light through an objective of a confocal microscope onto said specimen to thereby illuminate a plurality of surface portions thereof, sensing light reflected from only those surface portions thereof that are within said objective's depth of field and numerical aperture, determining from said sensed reflected light a spatial slope for said surface portions, and integrating said determined spatial slopes to thereby generate a topographical map representative of said light reflecting surface portions, said topographical map thereby comprising said topographical image of said specimen.

25. A method as set forth in claim 24 further comprising the step of re-positioning said specimen with respect to said objective, as required, to bring more of the surface portions of said specimen within the objective's depth of field.

26. The method as set forth in claim 25 wherein the step of directing incident light includes the step of scanning said specimen with the incident light to thereby sequentially illuminate separate surface portions of the specimen.

27. The method as set forth in claim 26 wherein the step of sensing the reflected light includes the step of sensing a profile of said reflected light.

28. The method as set forth in claim 27 wherein the step of sensing a profile includes the step of marking said reflected light from each of said surface portions with an aperture, and illuminating again each of said surface portions as said aperture is re-positioned.

29. The method as set forth in claim 28 wherein the integrating step includes the step of normalizing the values of height of adjacent determined spatial slopes.

30. The method as set forth in claim 27 wherein the step of determining the spatial slope includes the step of calculating a spatial slope from the sensed profile of each surface portion.

31. The method as set forth in claim 30 wherein the step of calculating a spatial slope includes the step of referring to a look up table.

32. A confocal microscope for generating a topographical image of a specimen, said device comprising:

an incident light source for directing incident light through an objective onto said specimen to thereby illuminate a plurality of surface portions thereof, a detector in a reflected light path for detecting light reflected from only those surface portions that are within the objective's depth of field a numerical aperture, and an electronic processor configured for determining a spatial slope for said surface portions, and integrating said determined spatial slopes into a topographical map to thereby generate a topographical image of the specimen.

33. A confocal microscope for approximating a spatial slope of a surface portion of a specimen, said microscope having:

optical elements configured for directing incident light along an incident light path from a light source to the surface portion of the specimen and for directing light reflected from the surface portion along a return light path, one of the optical elements including an exit pupil in the return light path, the optical elements being positioned and configured so that the exit pupil is illuminated by the reflected light in a manner dependent upon the spatial slope of the surface portion of the specimen;

a sensor in the return light path for generating at least one signal representative of the manner of illumination of the exit pupil; and a processor for matching the generated signal to a signal associated with light reflected from a surface of a known spatial slope.

34. A confocal microscope for approximating a spatial slope of a surface portion of a specimen, said microscope having:

optical elements configured for directing incident light along an incident light path from a light source to the surface portion of the specimen and for directing light reflected from the surface portion along a return light path, one of the optical elements including an exit pupil in the return light path, one of the optical elements including an objective having a numerical aperture angle of at least approximately 50°, the optical elements being positioned and configured so that the exit pupil is illuminated by the reflected light in a manner dependent upon the spatial slope of the surface portion of the specimen; and a sensor in the return light path for generating at least one signal representative of the manner of illumination of the exit pupil.

35. A confocal microscope for approximating a slope and orientation of a surface portion of a specimen, said microscope having:

optical elements configured for directing incident light along an incident light path from a light source to the surface portion of the specimen and for directing light reflected from the surface portion along a return light path; and means for detecting characteristics of the reflected light sufficient to approximate the spatial slope of the surface portion of the specimen.

36. A microscope as set forth in claim 35 wherein said optical elements are configured for directing incident light of a particular shape and direction to said surface portion so that the reflected light is of a particular shape.

37. A microscope as set forth in claim 36 wherein said detecting means comprises means for sensing a characteristic associated with the shape and position of a projection of at least a portion of the reflected light onto a particular area of a given plane.

38. A microscope as set forth in claim 37 wherein said sensing means includes a masking element positioned relative to said given plane and configured so that a portion of said particular area is masked by the masking element and another portion of said particular area is unmasked by the masking element, the masking element being moveable relative to said particular area for varying the portion of said particular area which is unmasked.

39. A microscope as set forth in claim 30 wherein said detecting means further comprises means for generating a plurality of signals, each signal being representative of an area which is common to said projection and to the unmasked area portion associated with each of a plurality of discrete positions of the masking element relative to said particular area.

40. A confocal microscope for generating an image of a specimen, said microscope having:

an objective configured for being spaced a distance from the specimen at which at least part of the specimen is within the in-focus plane of the objective;

optical elements configured for directing incident light to discrete regions of the in-focus plane of the objective to illuminate surface portions of the specimen that are within the discrete regions;

a sensor for sensing light reflected from the surface portions and for generating signals representative of the sensed light; and a processor configured for approximating, in response to the signals generated by the sensor, spatial slopes of each surface portion of the specimen within the discrete regions of the in-focus plane.

41. A microscope as set forth in claim 40 wherein the processor is further configured for integrating the determined spatial slopes to generate a topographical map representative of surface portions of the specimen.

42. A microscope as set forth in claim 40 wherein said optical elements are configured for directing incident light of a particular shape and direction to said discrete regions so that the reflected light is of a particular shape.

43. A microscope as set forth in claim 42 wherein said optical elements are configured for projecting at least a portion of the reflected light onto a particular area of a given plane.

44. A microscope as set forth in claim 43 further comprising a masking element positioned relative to said given plane and configured so that a portion of said particular area is masked by the masking element and another portion of said particular area is unmasked by the masking element, the masking element being moveable relative to said particular area for varying the portion of said particular area which is unmasked.

45. A microscope as set forth in claim 44 wherein the sensor is configured for generating a plurality of signals, each signal being representative of an area which is common to the projection and to the unmasked area portion associated with each of a plurality of discrete positions of the masking element relative to said particular area.

46. A microscope as set forth in claim 40 wherein the objective has a numerical aperture angle of at least approximately 50°.

47. A microscope as set forth in claim 40 wherein the objective has a numerical aperture angle of at least approximately 60°.

* * * * *